Sept. 3, 1963　　　H. C. PINKSTON ETAL　　　3,102,454
FLUID DRIVE
Filed Dec. 5, 1955　　　　　　　　　　　　　4 Sheets-Sheet 1

WITNESSES
Robert C. Baird
E. F. Oberhein

Direction of RF Radiation

INVENTORS
Herbert C. Pinkston, Lynford W. Gilbert
and Wayne B. Lloyd.
BY Paul E. Friedemann
ATTORNEY Sept. 3, 1963

H. C. PINKSTON ETAL 3,102,454

FLUID DRIVE

Filed Dec. 5, 1955

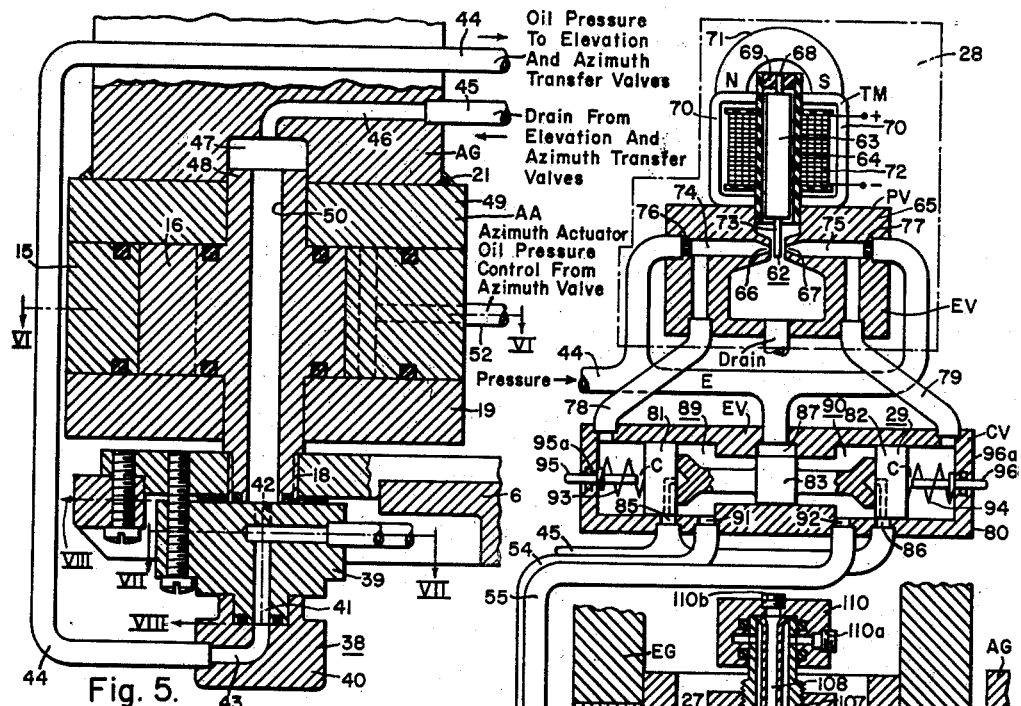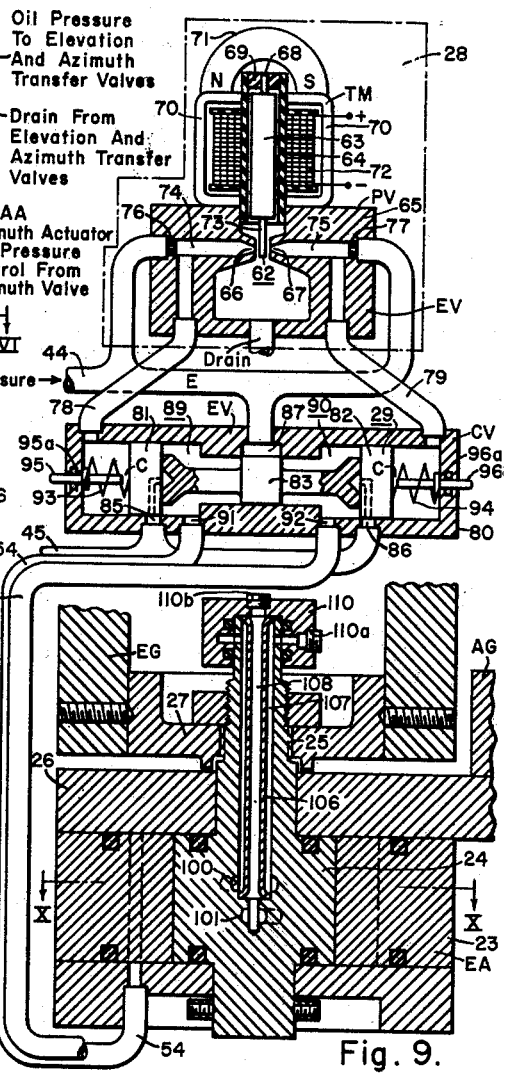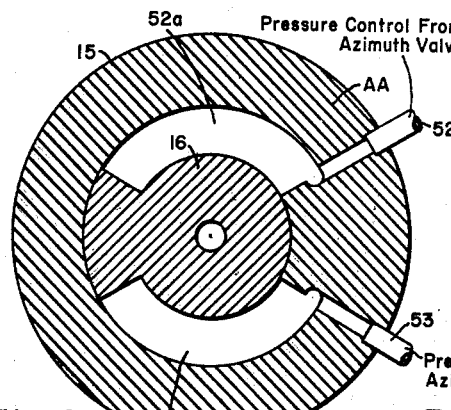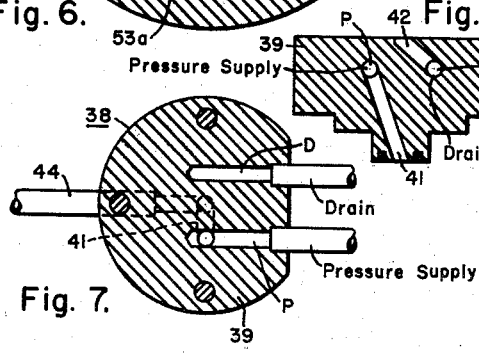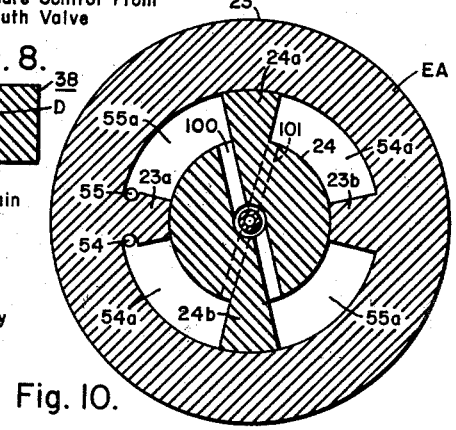

United States Patent Office 3,102,454
Patented Sept. 3, 1963

3,102,454
FLUID DRIVE
Herbert C. Pinkston, Baltimore, Md., Lynford W. Gilbert, Los Angeles, Calif., and Wayne B. Lloyd, Baltimore, Md., assignors to Westinghouse Electric Corporation, East Pittsburgh, Pa., a corporation of Pennsylvania
Filed Dec. 5 1955, Ser. No. 550,918
7 Claims. (Cl. 91—414)

This invention relates generally to two degree of freedom mechanical systems, and more particularly, to such systems wherein separate fluid actuating means are utilized to effect mechanical movement in the respective degrees of freedom.

Systems of this general type are employed in angular positioning of a device where angular space mobility over a given range is required. Typical devices, so positioned, include sighting devices, searchlights and antennas, to mention a few. In all these applications positive coupling with the drive means is essential, that is, coupling between the drive means and the device which is devoid of lost motion due to mechanical linkages. Frequently, such linkages involve links or gears or combinations of both, and although these linkages are accurately made within modern machine tool tolerances, linkage backlash or "slop" is present in some degree. This is undesirable in almost all applications. Moreover, such linkages usually involve parts which are expensive to manufacture and time consuming to assemble and which also tend to increase the size and complexity of the assembly.

Accordingly, one object of this invention is to provide a two degree of freedom fluid operated system of the character referred to which is simple with respect to operational requirements and positive in operation.

Another object of this invention is to provide a two degree freedom fluid operated system of the character referred to which is essentially free of lost drive motion.

Yet another object of this invention is to provide a two degree of freedom fluid operated system which is structurally compact and involves a minimum number of parts.

A further object of this invention is to provide a two degree of freedom fluid operated drive employing separate actuator or power means in each of said two degrees wherein direct coupling between said respective actuators or power means and the elements driven thereby is provided.

More specifically stated, it is an object of this invention to provide a two degree of freedom fluid drive including a first pivotally mounted gimbal having a second gimbal pivotally mounted thereon about an axis angularly displaced from the axis of said first gimbal, wherein respective rotary fluid powered actuators are concentrically mounted of said respective axes and are directly connected to drive said respective gimbals.

Further separate and combined objects of this invention are to provide, in an arrangement of the type referred to, improved and simplified fluid or hydraulic system organizations with respect to the mechanical system to improve reliability and durability of the arrangement, and to provide improvements in the actuator assemblies and in their connections to other components in the hydraulic system through which actuator control is afforded.

The foregoing statements are merely illustrative of the various aims and objects of this invention. Other objects and advantages will become aparent from a study of the following specification when considered in combination with the acompanying drawings, in which.

Figure 2:
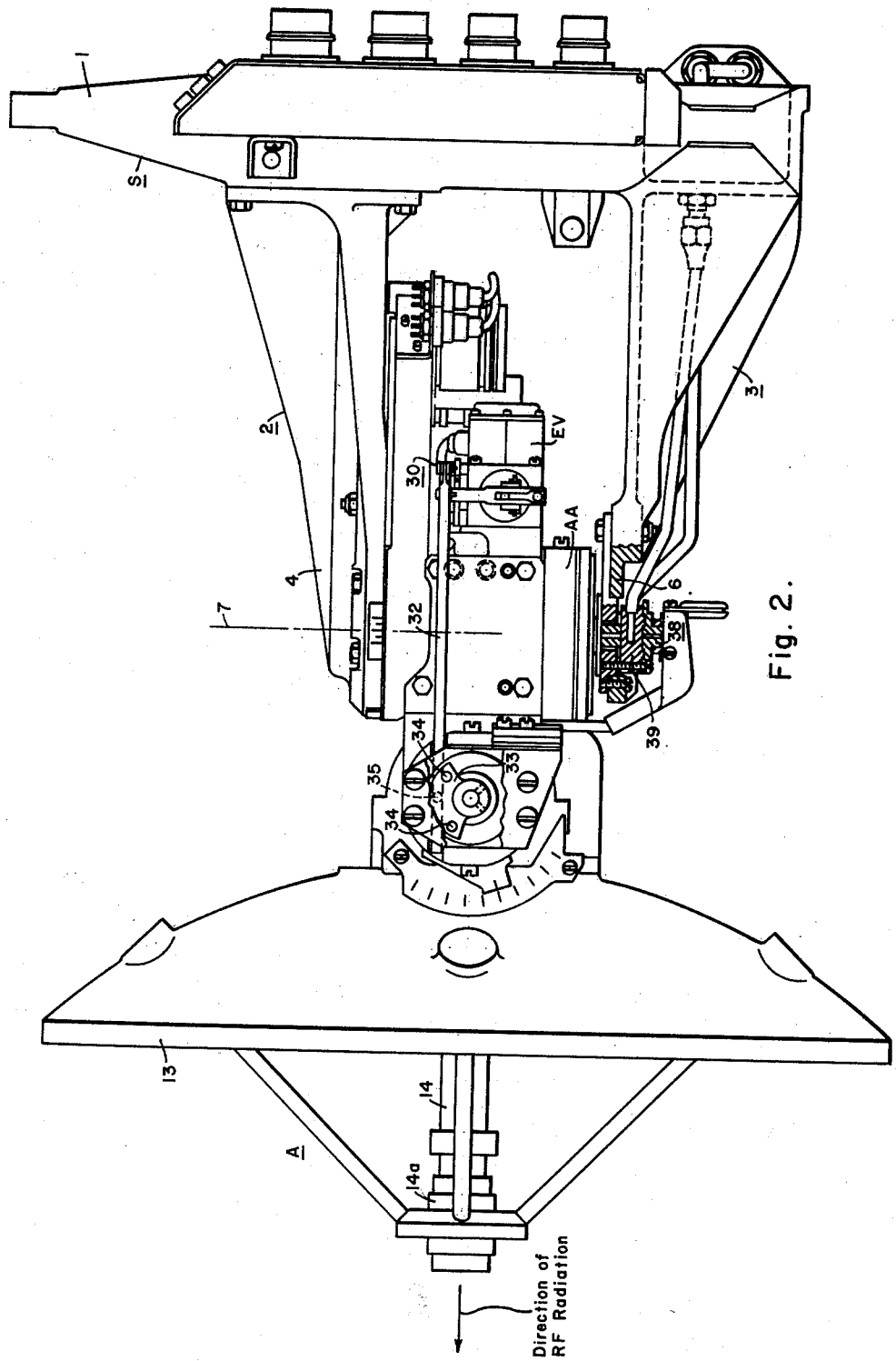
FIG. 2 is an elevational view of the assembly of FIG. 1.
Figure 3:
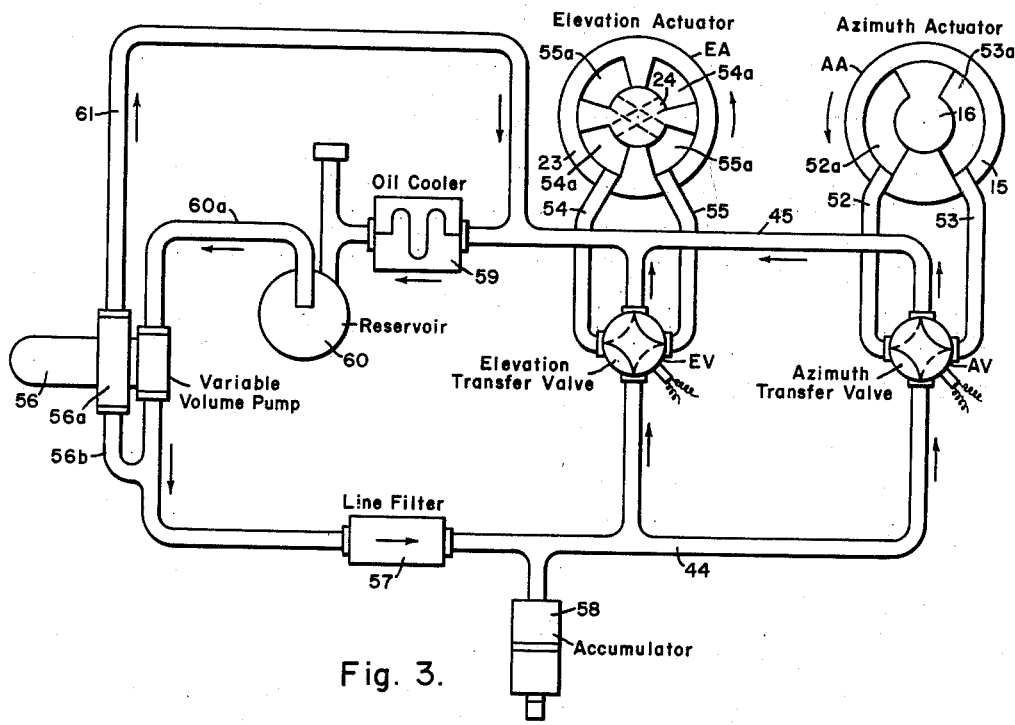
Figure 4:
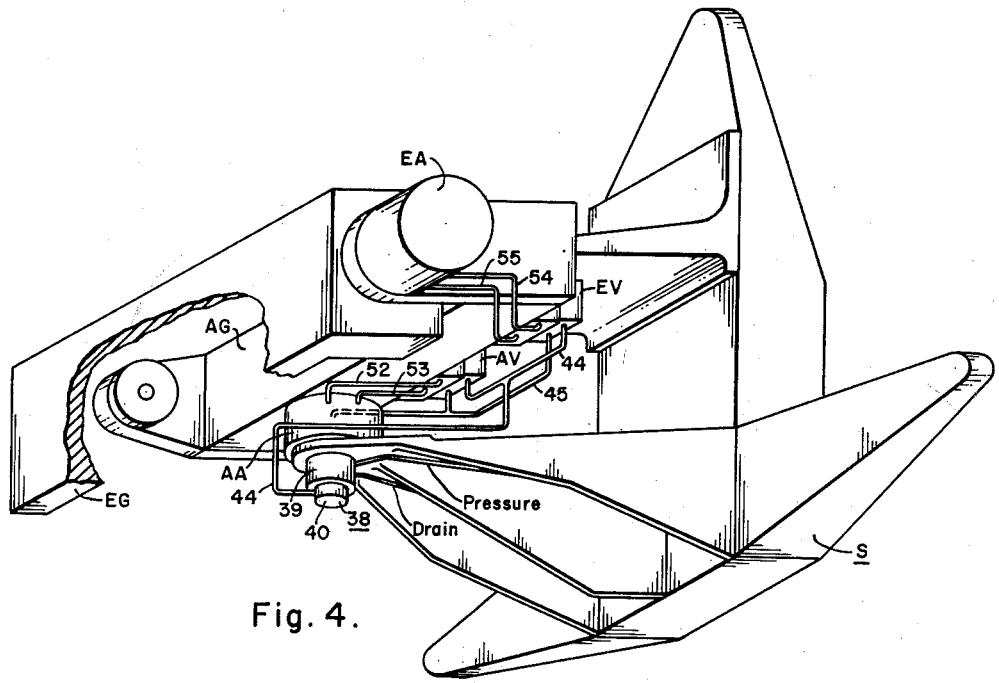

FIG. 3 schematically illustrates the fluid or hydraulic system herein employed;

FIG. 4 is a perspective view of the antenna mount viewed from the bottom side thereof illustrating the physical organization of the fluid or hydraulic system;

FIG. 5 is an enlarged sectional detail of the rotary azimuth hydraulic actuator and rotating fluid seal associated therewith as seen in FIG. 2;

FIG. 6 is a sectional view taken on line VI—VI of FIG. 5;

FIG. 7 is a sectional view taken on line VII—VII of FIG. 5 and illustrating certain details of the rotary fluid seal;

FIG. 8 is a sectional view taken on the line VIII—VIII of FIG. 5 and illustrating further details of the rotary fluid seal;

FIG. 9 schematically illustrates a fluid type of servo system typical of those employed herein and with reference to the elevation gimbal drive; and, FIG. 10 is a sectional view taken on the line X—X of FIG. 9.

The illustration of this invention in the drawings in connection with an antenna drive is merely illustrative of a typical application of the present invention in positioning a device in each of two angular degrees of freedom. The invention is not be construed as limited in any respect to the specific application herein illustrated and described.

Figure 1:
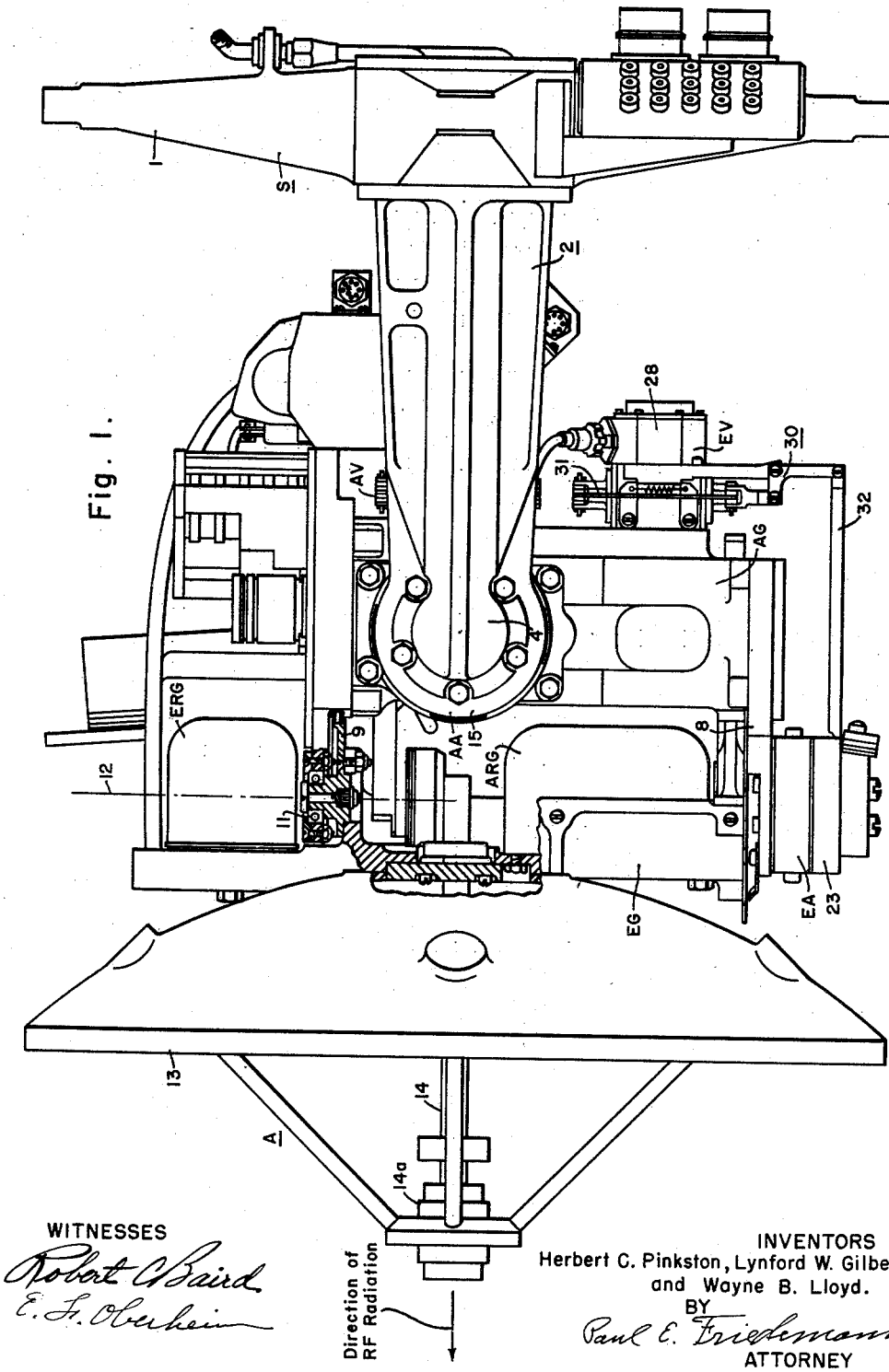
FIGURE 1 is a top plan view of a fluid operated antenna drive embodying the principles of this invention.

The antenna drive comprising a support is generally designated S which comprises a three-legged base 1 adapted to be secured to a bulkhead or other suitable structure in an aircraft. The details of such mounting are not illustrated in the interest of simplicity. The support assembly includes additionally a pair of vertically spaced supports or legs 2 and 3 which project forwardly from the base 1 and terminate in suitable bearing ends 4 and 6 respectively. An azimuth gimbal assembly generally designated AG is journaled between the bearing ends 4 and 6 for rotation about an azimuth axis indicated at 7 in FIG. 2. An elevation gimbal assembly generally designated EG is journaled between bearing supports 8 and 9 projecting forwardly from the azimuth gimbal assembly. The bearing axis defined by the bearings, such as bearing 11 in the support 9, is termed the elevation gimbal axis and is designated 12 as seen in FIG. 1. This axis occupies a position substantially at right angles to the azimuth gimbal axis, the assembly providing two degrees of angular freedom for the elevation gimbal EG. The elevation gimbal mounts an antenna assembly A which conventionally comprises a reflector dish 13, an RF energy tube 14 and a feed mechanism 14a at the focal point which directs the RF energy back to the reflector which, in turn, reflects the RF energy forwardly in the direction of the arrow indicated in both FIGS. 1 and 2.

Th azimut hand elevation gimbals are driven by respective rotary fluid powered actuators. The azimuth actuator, generally designated AA, comprises a housing 15 within which a single vane rotor 16 is positioned. As seen in FIGS. 2 and 5, the rotor 16 is provided with a splined extension 18 extending through one actuator end plate 19 into splined engagement with a cooperating opening in the bearing end 6 of the bottom support 3. By this expedient the rotor of the azimuth actuator is restrained from rotation. The housing 15 of the azimuth actuator is secured by any suitable means to the azimuth assembly AG, welding being herein indicated at 21. In the assembly, the axis of the rotor of the azimuth actuator coincides with the azimuth gimbal axis, and the azimuth actuator forms the lower bearing of the azimuth gimbal, the upper bearing of which is not illustrated but which may correspond to the bearing 11 illustrated in connection with the elevation gimbal in FIG. 1.

The elevation rotary actuator EA is secured to the elevation gimbal support 8 projecting from the azimuth gimbal, with its rotor axis coinciding with the elevation gimbal axis. The elevation actuator, which will be described in greater detail hereinafter, is illustrated in FIGS. 9 and 10 and as a dual vane actuator. The housing 23 of the elevation actuator EA is bolted to the support 8 projecting from the azimuth gimbal as seen in FIG. 1, and the rotor 24 is provided with a splined extension 25 projecting through the housing end plate 26 into splined engagement with a cooperating section 27 of the elevation gimbal. Thus, rotation of the elevation actuator rotor, in this instance, drives the elevation gimbal. In this assembly, it will be noted that the housing 15 of the azimuth actuator and the housing 23 of the elevation actuator are each secured to the azimuth gimbal to facilitate hydraulic connections thereto.

The respective azimuth and elevation actuators are supplied with fluid pressure from respective azimuth and elevation control valves designated AV and EV, respectively. These valve assemblies are both mounted on the back side of the azimuth gimbal assembly as seen in FIG. 1. The azimuth valve is partially obscured behind the bearing support 2. The details of these valves are similar. A schematic illustration of the elevation valve appears in FIG. 9 which will be described at a later point. Each of these valves is controlled electrically by means of an electrically operated pilot valve assembly. The elevation pilot valve housing, which appears on the elevation valve in FIG. 1, is designated 28.

Each valve is further controlled by direct mechanical connection to its valve spool assembly 29 such as seen in FIG. 9 by means of a mechanical linkage 30 which is typically represented in FIGS. 1 and 2. This linkage 30 comprises a parallelogram link assembly 31 straddling the ends of the valve spool assembly 29 and actuated by means of a push rod linkage 32 controlled by a cam 33, as seen in FIG. 2, driven by the rotor of the elevation actuator. By this means, the cam position, at any instant, corresponds to the angular position of the elevation gimbal about its axis. This cam is provided with respective circumferentially spaced pins 34 disposed on opposite sides of a pin 35 mounted on the push rod 32 in the arcuate path described by pins 34. The circumferential spacing between these pins is such that in the limits of its angular travel the elevation gimbal cam engages the push rod pin 35 to move the push rod linkage and parallelogram linkage at the valve spool 29 in such sense as to displace the valve spool in a direction reversed from the direction of displacement thereof caused by the electrically operated pilot valve assembly, to thereby override valve control and stop the elevation gimbal in its limit of travel.

A similar mechanical stop limit control is provided for the azimuth valve AV. Since the mechanical principles of the mechanical control of the azimuth valve corresponds to those described in connection with the elevation valve, and since the mechanical details per se form no part of this invention, these details have not been illustrated in the interest of simplicity.

As noted hereinabove, the azimuth and elevation valves AV and EV, respectively, control the azimuth and elevation actuators AA and EA. The fluid connections between these respective valves and the actuators which they control are schematically depicted in FIG. 4 and will be described at a later point.

Since both of these control valves are mounted on the azimuth gimbal, suitable means are conveniently provided for connecting these valves to a supply of fluid pressure. Such means includes a rotary fluid seal generally designated 38. The disposition of this rotary fluid seal in the general assembly appears in FIG. 2, and its enlarged details appear in FIGS. 5, 7 and 8.

The rotary seal comprises a stationary part 39 which is bolted to the bearing end 6 of the support 3 and is therefore stationarily secured. The stationary part 39 is fitted with a rotatable cap 40 which is freely rotatable thereon, but which is restrained against axial movement by suitable means not shown. The stationary part 39 of the rotary seal is provided with parallel passages extending along chords of the stationary part and occupying positions in the same axial plane, the pressure supply passage being designated P and the drain being designated D. These respective passages are adapted for connection to the pressure and drain or return lines of the fluid system. The pressure supply passage P communicates with a passage 41 drilled at an angle through the lower end face of the stationary part 39 and into the pressure supply passage P. The drain passage D communicates with a passage 42 drilled at an angle through the opposite face of the stationary part 39 into communication with the drain passage. By this expedient, the axial dimension of the stationary part is minimized, since the pressure and the drain passages are maintained in the same axial plane.

Passage 41, the open end of which is concentric with the axis of rotation of the rotary cap 40, communicates with a passage 43 which opens radially through the rotary cap 40. A fluid line 44 extends from the rotary cap 40 and supplies fluid pressure to both the azimuth and elevation valves as seen in FIG. 4. The drain line 45 from both the azimuth and elevation valves extend through a suitable passage 46 in the azimuth gimbal into a cavity 47 therein. The upper end 48 of the shaft of rotor 16 of the azimuth actuator projects through housing end plate 49 into the cavity 47 and axial passage 50 extends completely through the shaft of the azimuth actuator rotor 16 and communicates with the drain passage 42 in the stationary part 39 which in turn communicates with the drain passage D and with the drain or return line of the fluid system to complete the fluid circuit.

As seen in FIG. 4, fluid lines 52 and 53 connect the fluid output of the azimuth valve to the housing of the azimuth actuator, and fluid lines 54 and 55 connect the fluid output of the elevation valve EV to the housing of the elevation actuator EA. For the purpose of—drawing convenience, all of the fluid connections in and about the azimuth gimbal assembly have been indicated as external fluid lines. However, as a practical expedient, it is convenient to provide all such connections through suitable passages provided through the azimuth gimbal. This minimizes external complications on the azimuth gimbal assembly and further minimizes the possibility of physical damage to the fluid system. The principles o fhte fluid system configuration, however, are embodied in the external connections illustrated.

The fluid system configuration is completely illustrated in the schematic presentation in FIG. 3 which is directed to a hydraulic system. Fluid pressure for the system is provided by means of a variable volume pump generally designated 56. Depending on conditions this pump may be driven by an electric motor or it may be driven as an accessory from some rotating part of the power unit of an aircraft. The variable volume pump supplies hydraulic fluid under pressure through a line filter 57 to a hydraulic accumulator 58 which parallels the pressure supply line 44. The accumulator, as is well known, acts as a substantially constant pressure reservoir tending to maintain the hydraulic pressure substantially constant in the loads connected thereto. Parallel branches of the hydraulic pressure supply line 44 connect to the azimuth and elevation valves and supply hydraulic fluid under pressure thereto. The azimuth valve ports the hydraulic fluid to and from the variable volume cavities 52a and 53a of the azimuth actuator through conductors 52 and 53 to control rotation of the single vane rotor 16. The elevation valve ports hydraulic fluid through hydraulic lines 54 and 55 to and from the variable volume cavities 54a and 55a of the dual vane elevation actuator. The hydraulic fluid returning from the diminishing volume cavities of the respective actuators is ported by the respective valves into the line 45 which is returned through an oil cooler 59 to the reservoir 60. The reservoir outlet communicating with the input of the variable volume pump is designated 60a. Provision is made in the system for controlling the pumping action of the pump pistons as a function of pump output pressure. This is done by means of a displacement controlling mechanism 56a which is not detailed, being conventional. This mechanism operates to reduce piston displacement to thereby prevent excessive pressure. Line 61 is a pump case drain provided to carry away piston blow-by oil from the pump. This flow of oil from the pump, though small, is recirculated through the oil cooler and provides a small cooling oil flow for the pump. Line 56b connects pump outlet pressure to the displacement controlling mechanism which is responsive thereto.

The elementary principles involved in the fluid servo for the elevation gimbal illustrated in FIG. 9 is typical also of the type of fluid control provided by the azimuth servo. Consequently, it is believed that a discussion of the structure and function of the elevation servo will suffice for both.

As illustrated, an electrically operated pilot valve assembly 28, forming part of the elevation valve EV, controls the spool type of control valve CV which controls the application of fluid to the elevation actuator EA. The pilot valve assembly PV comprises a permanent magnet type of torque motor TM, which controls an open center type of pilot valve assembly 62.

The torque motor comprises a cylindrical armature member 63, which is mounted inside of a sleeve of non-magnetic material 64 secured in a suitable opening in the top of valve block 65 which is in communication with the confronting openings 66 and 67 of the pilot valve assembly. A leaf spring member 68 is secured to the upper end of the torque motor armature 63, and the end of this leaf spring is mounted in a plug 69 secured in the upper end of the sleeve 64 of non-magnetic material. This assembly of the armature within the tube seals the armature in a fluid tight casing which prevents fluid from circulating in and around the electrical components of the torque motor.

The magnetic circuit for the torque motor includes a pair of U-shaped pole pieces 70 of magnetic material arranged in diametrically disposed positions with respect to the tube 64, the legs of the U-shaped pole pieces substantially bracketing the armature 63 from one end to the other. The magnetic circuit is polarized by means of a permanent magnet 71 which bridges the upper legs, as viewed, of the two U-shaped pole pieces 70. This provides a pair of parallel magnetic circuits in the pole piece legs for the flow of magnetic flux from the magnet and linking the armature across the air gaps provided between the confronting legs of the pole pieces and the ends of the armature.

A coil 72 is disposed about the tube 64 within the pole pieces 70. This coil is adapted for energization with direct current and produces magnetic flux in the parallel circuit branches including the armature as a common leg and the respective pole pieces as separate branches. Thus, for one polarity of excitation of coil 72 the magnetic flux produced thereby which flows in opposite directions from the ends of the armature across the radial gaps to the respective pole pieces, opposes the permanent magnetic flux at a radial gap on one side of the armature and aids the permanet magnetic flux at the radial gap at the opposite side of the armature, viewed for example with respect to the radial gaps between the pole pieces and the bottom end of the armature, where the unbalanced magnetic pull operates on a longer effective moment arm on the armature than the unbalanced pull acting on the armature at the air gaps at the upper end of the armature.

The unbalanced magnetic forces thus produced displace the armature in the direction of the higher flux density. This displaces the vane 73 from its normal spring centered position between the confronting valve pilot openings 66 and 67 to a position, say, closer to the valve opening 67. The armature stops or reaches a displaced position in which the torque due to the unbalanced dynamic fluid forces acting on the vane 73 balances the magnetic torque acting on the armature, affording proportional control. This displacement of the armature and vane 73 from its normal spring centered position between the pilot valve openings produces an unbalance of fluid pressures in the pliot valve passages 74 and 75 which are supplied with fluid under pressure from supply line 44 through restrictions 76 and 77 in the entrances to the respective pilot valve passages 74 and 75.

The differential of the pressures existing in the passages 74 and 75 appears as an unbalanced force acting on the spool assembly 29 of the control valve CV. This is accomplished by connecting the ends of the control valve housing to the pilot valve passages through hydraulic lines 78 and 79. The control valve housing 80 slidably receives the spool valve assembly 29. In this assembly the valve is provided with a pair of equal diameter outer lands or spools 81 and 82 mechanically connected with a center land or spool 83. The two outer spools 81 and 82 control respective exhaust ports 85 and 86 which connect to the drain line 45. The center spool 83 ports the high pressure fluid from the inlet port 87, connected to the fluid pressure supply line 44, selectively into the valve cavities 89 and 90 disposed on opposite sides of the center spool and formed between the center spool and the respective outer spools. The high pressure control ports of the control valve assembly are designated 91 and 92, and these are connected by respective fluid conductors 54 and 55 to the variable volume cavities 54a and 55a of the elevation actuator EA.

The spool valve assembly is spring loaded to its neutral or center position indicated in the control valve housing, by means of respective centering springs 93 and 94 disposed between the respective outer spools and the ends of the control valve housing. Pusher pins 95 and 96 are slidably fitted through the ends of the control valve housing. The sliding fits are sealed by respective O-rings 95a and 96a. These pusher pins are separate from the outer lands or spools 81 and 82. Normally a small clearance C is present. In one practical embodiment this clearance amounts to about 0.015 inch minimum so that the spool may move with complete freedom without the friction produced by the pusher pins. Otherwise, precision lapped fits would be required on these pins to keep friction low. Each pin is maintained in the full outward position shown by fluid pressure until the mechanical limit stop mechanism pushes it toward center. Thus the pins provide a means for mechanically engaging the spool valve assembly by parallelogram linkage 31 to apply axial forces thereto to override the torque motor control of the spool valve assembly, as described in connection with the limit stop linkage of the elevation actuator as seen in FIG. 1.

The provision of a center spool 83 of lesser diameter or different diameter than the outer spools 81 and 82 provides a pressure feedback control on the spool valve proportional to the differential of the pressures appearing in cavities 89 and 90 to provide a means of achieving adequate control in the presence of system compliance due to fluid compressibility as well as to damp system operations and improve system stability. This subject matter is described in detail in a copending application of Wayne B. Lloyd, entitled, Hydraulic System, filed July 20, 1956, Serial Number 599,157, now Patent Number 2,889,815 granted June 9, 1959 and assigned to the assignee of this invention.

The elevation actuator housing 23 is provided with a pair of stationary vanes 23a and 23b which are arranged in diametrically disposed positions projecting inwardly of the internal cylindrical cavity in the actuator housing. The rotor 24 of the elevation actuator is journaled between the end plates of the housing 23, one of which is designated 26, and is provided with a pair of diametrically disposed vanes 24a and 24b. The vanes 24a and 24b are herein illustrated as integral parts with the rotor 24. Preferably for simplicity of manufacturing these are separately machined and bolted to the separately machined rotor hub which sweeps across the arcuate faces of the stationary vanes 23a and 23b. The stationary and moving vanes of the actuator divide the cylindrical housing cavity into two pairs of variable volume cavities. The cavities of one pair are each denoted 54a and the cavities of the other pair are each denoted 55a. The cavities of the respective pairs vary correspondingly in volume with displacement of the rotor, and are in communication with each other through radial passages 100 and 101 which lie in different axial planes of the rotor.

In an application such as herein described in which the actuator housing is stationary with respect to the control valve assembly which ports the fluid thereto, the fluid connections may be made, for example, directly through the housing into the cavities 54a and 55b on opposite sides of the stationary vane 23a. Thus, for example, if the hydraulic fluid admitted to cavity 54a is at higher pressure than the hydraulic fluid admitted to the cavity 55a, the rotor of the dual vane actuator will move in a counterclockwise direction as viewed in FIG. 10. Additionally, the pressure existing in the cavity to which the hydraulic pressure is admitted in each case will also appear in the corresponding diametrically opposite cavity by reason of the communication afforded between the cavities of the respective pairs by the radial passages 100 and 101. Thus, balanced forces are exerted on the actuator vanes and balanced torque couples are applied in driving the actuator. Higher torques are produced by the dual vane actuator than are producible with the same fluid pressure differentials in a corresponding single vane rotor of the type shown in FIG. 6. Additionally, the torque load is balanced.

Another way in which pressure feedback may be obtained, to compensate system compliance due to oil compressibility, involves a concentric passage arrangement in the rotor communicating with radial passages 100 and 101 in the dual vane actuator. In this arrangement, the shaft of the dual vane rotor is provided with a counterbored axial passage, the small end of which intercepts the radial passage 101 and the counterbored section of which terminates in a plane between the passages 101 and 100. A tubular section 106, provided with flanged extremities, is fitted within the counterbored section of the axial passage with its flanged ends providing fluid tight seals with the ends of the counterbored passage. This provides a pair of concentric passages 107 and 108 communicating respectively with passages 100 and 101. The center passage 108 opens through the end of the shaft of the actuator rotor 24, and connects through a cap 110 securely fitted on the end of the rotor actuator shaft. The outer passage 107 is radially ported through the actuator rotor shaft at a point within the rotatable cap 110, and communicates with an annular passage within the cap. When used to provide pressure feedback suitable hydraulic connections are made to plugged openings 110a and 110b which, in turn, connected to pressure operated potentiometers of a conventional type (not shown). The pressure operated potentiometers provided an electrical signal proportional to differential pressure which is used as a feedback signal for an amplifier (not shown) which controls the torque motor TM. By attaching the pressure potentiometers to the elevation gimbal EG, cap 110 may be secured to the dual vane actuator shaft without the need for rotating with respect thereto, since this shaft is secured to drive the elevation gimbal. This elminates the need for a rotating seal and eliminates friction at that joint. In view of the limited angular freedom of the elevation gimbal and the small power requirements at the pressure potentiometers, electrical connections are conveniently made with small flexible electrical conductors.

It will be appreciated, of course, that the concentric passages may be used to transmit fluid pressure to the actuator to drive the actuator in the event, for example, the housing is rotated with respect to its control valve.

The pattern of operation of the antenna is controlled from respective electrical control sources which, for example, may be oscillators conventionally employed for this purpose, wherein a reversible polarity direct current signal is applied to the coil of the azimuth torque motor and a pulse type signal is applied to the coil of the elevation torque motor, said coils respectively forming part of the elevation and azimuth valve systems EV and AV respectively. Proper coordination of these signals, assuming the antenna is in its uppermost position of elevation, provides a sweep of the antenna in azimuth from one extreme to the other at which point the elevation pulse deflects the elevation gimbal and antenna downwardly in elevation a predetermined number of degrees whereupon the signal from the azimuth oscillator to the azimuth torque motor coil is reversed to reverse the antenna sweep in the azimuth. At the other azimuth extreme, a second elevation signal pulse is applied to the elevation torque motor coil which sweeps the elevation gimbal and antenna downwardly again the said predetermined number of degrees. This action continues until the lower elevation limit is reached at which time the antenna is returned to its starting point in both azimuth and elevation, and thereafter the cycle is repeated. Since the details of such an oscillator system form no part of this invention they are not illustrated.

In practice to control angular rates of scanning in both azimuth and elevation, rate gyroscopes are employed to detect angular sweep rates in both azimuth and elevation. These gyroscopes are indicated in outline only and designated ARG and ERG for the azimuth rate gyro and elevation rate gyro respectively. Both of these gyroscopes appear in FIG. 1. These gyroscopes are secured to the elevation gimbal assembly, and their rotors are oriented in such respects, as well known in the art, to respond only to the particular angular rate which each is to detect and to be substantially insensitive to angular rates about the axis of the other degree of freedom of the assembly. Insensitivity to angular rates is conveniently accomplished by paralleling the axis of rotation of the rotor with the axis about which the unwanted angular rate occurs. Suitable electrical pickoffs of gyroscopes precessional movement (not shown) are provided and are connected around the electrohydraulic servo loop and mixed with the input signals to the coil of the corresponding torque motor to regulate the operation of the pilot valve assemblies and consequently, regulate the angular rate at which antenna sweep takes place. Arrangements, whereby such operation may be accomplished, have not been shown since conventional expedients and practices may be involved in accomplishing these stated ends, and such arrangements per se form no part of the present invention.

From the foregoing considerations, it will be appreciated that the applicants have provided a two degree freedom fluid drive, in which the complications of fluid communication with the moving system, in which the actuators for the moving system are mounted, have been minimized by reason of the location of the actuator housings and the control valves for the actuators on a single moving element of said two degree freedom system. Obviously this elementary principle controlling the configuration of the drive may be realized with instrumentalities and structures differing in specific detail and in detail organization from that which has been disclosed herein. Accordingly, it is intended that the foregoing disclosure and the showings made in the drawings shall be considered only as illustrative of the principles of this invention and not construed in a limiting sense.

We claim as our invention:

1. A two degree of freedom fluid operated drive comprising, a support, a first member pivotally mounted on said support for angular movement about a first axis, a second member pivotally mounted on said first member for angular movement about a second axis angularly displaced from said first axis, a first fluid operated rotary actuator having a housing secured to said first member substantially concentrically of said first axis and having a hollow shaft rotor connected to said support, a second fluid operated rotary actuator having a housing secured to said first member substantially concentrically of said second axis and having a rotor connected to said second member, first and second fluid control valves mounted on said first member and having respective pairs of fluid connections with said housings of said first and second actuators, a rotary seal comprising a stationary part having a pair of fluid passages therethrough and having a rotary part including a passage communicating with one of said pair of passages, said stationary part being arranged on said support with the other of said pair of passages communicating with said hollow shaft, a fluid connection between said passage in said rotary part and both of said valves, a fluid connection between both of said valves and said hollow shaft, and means for operating said valves.

2. A two degree of freedom fluid operated drive comprising, a support, a first member pivotally mounted on said support for angular movement about a first axis, a second member pivotally mounted on said first member for angular movement about a second axis angularly displaced from said first axis, a first fluid operated rotary actuator having a housing secured to said first member substantially concentrically of said first axis and having a hollow shaft rotor connected to said support, a second fluid operated rotary actuator having a housing secured to said first member substantially concentrically of said second axis and having a rotor connected to said second member, first and second fluid control valves mounted on said first member and having respective pairs of fluid connections with said housings of said first and second actuators, a rotary seal comprising a stationary part on said support and a rotary part on said stationary part and having a fluid passage through said stationary and rotary parts, a fluid connection between said passage at said rotary seal and both of said valves, a fluid connection between both of said valves and said hollow shaft on said first member, a fluid circuit having one side connected to said passage at said stationary part and having its other side connected to said hollow shaft, and means for operating said valves.

3. A two degree of freedom fluid operated drive comprising, a support, a first member pivotally mounted on said support for angular movement about a first axis, a second member pivotally mounted on said first member for angular movement about a second axis angularly displaced from said first axis, a first fluid operated rotary actuator having a housing secured to said first member substantially concentrically of said first axis and having a hollow shaft rotor connected to said support, a second fluid operated rotary actuator having a housing secured to said first member substantially concentrically of said second axis and having a rotor connected to said second member, first and second fluid control valves mounted on said first member and having respective pairs of fluid connections with said housings of said first and second actuators, a rotary seal comprising a stationary part on said support and having a rotary part on said stationary part rotatable about an axis substantially coinciding with said first axis, said rotary seal having a first passage through said stationary part and said rotary part connected to both of said valves and having a second passage through said stationary part communicating with said hollow shaft at said support, both of said valves having fluid connections with said hollow shaft at said first member, said first and second passages providing fluid supply connections at said stationary part, and means for operating said valves.

4. A two degree of freedom fluid operated drive comprising, a support, a first member pivotally mounted on said support for angular movement about a first axis, a second member pivotally mounted on said first member for angular movement about a second axis angularly displaced from said first axis, a first fluid operated rotary actuator having a housing secured to said first member substantially concentrically of said first axis and having a hollow shaft rotor connected to said support, a second fluid operated rotary actuator having a housing secured to said first member substantially concentrically of said second axis and having a rotor connected to said second member, first and second fluid control valves mounted on said first member and having respective pairs of fluid connections with said housings of said first and second actuators, fluid pressure supply connections at said respective valves, respective valve operating means at said valves for operating said valves and supplying fluid pressure to said respective actuators, a lost motion connection between said first valve and said support for operating said first valve in a sense to reverse movement of said first member in the limit of movement of said first member, and a lost motion linkage between said second valve and said second member for operating said second valve in a sense to reverse movement of said second member in the limit of movement of said second member.

5. A dual vane actuator comprising, a stator having a pair of diametrically disposed inwardly projecting stationary vanes, a rotor rotatably fitted within said stator and having a pair of diametrically disposed vanes arranged for angular movement respectively with rotor rotation between said respective stationary vanes and forming two pairs of corresponding variable volume cavities therewith, said rotor having diametric, axially displaced passages therethrough communicating between the respective cavities of the respective pairs, said stator having a pair of passages, one stator passage communicating with one pair of said variable volume cavities and the other stator passage communicating with the other pair of said variable volume cavities for providing first connections for fluid pressure transmission to and from said variable volume cavities, said rotor having a pair of concentric axially disposed passages opening through one end and respectively connecting with said diametric passages providing second connections for fluid pressure transmission to and from said variable volume cavities.

6. A dual vane actuator comprising, a stator having a pair of diametrically disposed inwardly projecting stationary vanes, a rotor rotatably fitted within said stator and having a pair of diametrically disposed vanes arranged for angular movement respectively with rotor rotation between said respective stationary vanes and forming two pairs of corresponding variable volume cavities therewith, said rotor having diametric, axially displaced passages therethrough communicating between the respective cavities of the respective pairs, said stator having a pair of passages, one stator passage communicating with one pair of said variable volume cavities and the other stator passage communicating with the other pair of said variable volume cavities for providing first connections for fluid pressure transmission to and from said variable volume cavities, said rotor having a shaft journaled in said stator and terminating at least at one end externally of said stator, said shaft having a pair of concentric axially disposed passages respectively communicating with said diametric passages, the inner of said concentric passages opening through the end of said rotor and the outer of said concentric passages opening radially through said shaft adjacent said one end thereof, a cap concentrically fitted over said one end of said shaft in fluid tight relation therewith and having separate openings therein respectively communicating with said inner and outer concentric passages providing second separate points of fluid communication with said respective pairs of variable volume cavities.

7. A dual vane actuator comprising, a stator having a pair of diametrically disposed inwardly projecting stationary vanes, a rotor rotatably fitted within said stator and having a pair of diametrically disposed vanes arranged for angular movement respectively with rotor rotation between said respective stationary vanes and forming two pairs of corresponding variable volume cavities therewith, said rotor having diametric, axially displaced passages therethrough communicating between the respective cavities of the respective pairs, said stator having a pair of passages, one stator passage communicating with one pair of said variable volume cavities and the other stator passage communicating with the other pair of said variable volume cavities for providing first connections for fluid pressure transmission to and from said variable volume cavities, said rotor having a shaft journaled in said stator and terminating at least at one end externally of said stator, said rotor having a counterbored axial passage communicating with both diametric passages, the counterbored portion terminating between said diametric passages, a tube of lesser outside diameter than the diameter of counterbore sealed at one end to the end of said counterbore and sealed at the other end adjacent said one end of said shaft, said shaft having radial openings therethrough adjacent said one end, said tube defining an inner passage opening through said one end of said shaft and an outer passage opening through said radial openings said inner and outer passages communicating, respectively, with said respective diametric passages, a cap concentrically fitted over said one end of said shaft in fluid tight relation therewith and having a first opening therein communicating with said inner passage and a second opening communicating with said outer passage providing second separate paths of fluid communication with said respective pairs of variable volume cavities.

References Cited in the file of this patent
UNITED STATES PATENTS

| | | |
|---|---|---|
| 1,680,834 | Wood | Aug. 14, 1928 |
| 2,141,953 | Hawes | Dec. 27, 1938 |
| 2,450,152 | Miller | Sept. 28, 1948 |
| 2,595,131 | Ehmann | Apr. 29, 1952 |
| 2,628,594 | Teague | Feb. 17, 1953 |